(12) United States Patent
Lucashu et al.

(10) Patent No.: US 8,998,575 B2
(45) Date of Patent: Apr. 7, 2015

(54) STRUCTURAL STATOR AIRFOIL

(75) Inventors: John P. Lucashu, Durham, CT (US); Gregory E. Reinhardt, South Glastonbury, CT (US); John C. Ditomasso, Glastonbury, CT (US)

(73) Assignee: United Technologies Corporation, Hartford, CT (US)

(*) Notice: Subject to any disclaimer, the term of this patent is extended or adjusted under 35 U.S.C. 154(b) by 665 days.

(21) Appl. No.: 13/295,724

(22) Filed: Nov. 14, 2011

(65) Prior Publication Data

US 2013/0121833 A1  May 16, 2013

(51) Int. Cl.
*F03D 11/00* (2006.01)
*F01D 9/04* (2006.01)

(52) U.S. Cl.
CPC . *F01D 9/04* (2013.01); *Y02T 50/672* (2013.01)

(58) Field of Classification Search
CPC ................................. F01D 9/04; F01D 25/28
USPC .............. 415/142, 182.1, 183, 189, 190, 191, 415/192, 209.3; 416/203, 219 R
See application file for complete search history.

(56) References Cited

U.S. PATENT DOCUMENTS

| | | | |
|---|---|---|---|
| 2,763,462 A | 9/1956 | McDowall et al. | |
| 2,836,959 A | 6/1958 | McDowall et al. | |
| 3,881,315 A | 5/1975 | Hess et al. | |
| 5,149,012 A | 9/1992 | Valverde | |
| 5,471,743 A | 12/1995 | Munroe et al. | |
| 5,873,699 A | 2/1999 | Watson et al. | |
| 5,927,130 A | 7/1999 | Watson et al. | |
| 6,068,213 A | 5/2000 | Gonidec et al. | |
| 6,371,725 B1* | 4/2002 | Manteiga et al. | 415/209.4 |
| 6,554,564 B1* | 4/2003 | Lord | 415/119 |
| 7,444,802 B2* | 11/2008 | Parry | 60/226.1 |
| 7,716,932 B2 | 5/2010 | Core | |
| 7,730,715 B2 | 6/2010 | Grudnoski et al. | |
| 8,727,721 B2* | 5/2014 | Tudor et al. | 415/209.4 |
| 2003/0152459 A1* | 8/2003 | Gliebe | 415/211.2 |
| 2007/0224038 A1* | 9/2007 | Solomon et al. | 415/191 |
| 2008/0072569 A1* | 3/2008 | Moniz et al. | 60/226.1 |
| 2008/0295518 A1 | 12/2008 | Reba et al. | |
| 2010/0254803 A1 | 10/2010 | Papamoschou | |
| 2011/0146230 A1 | 6/2011 | LaChapelle et al. | |
| 2013/0333350 A1* | 12/2013 | Stilin et al. | 60/226.1 |

* cited by examiner

*Primary Examiner* — Dwayne J White
*Assistant Examiner* — Jason Fountain
(74) *Attorney, Agent, or Firm* — Kinney & Lange, P.A.

(57) ABSTRACT

An airfoil comprises a leading edge, a trailing edge, and pressure and suction surfaces defined therebetween. An inner platform is coupled to a root section of the airfoil, with a curvilinear gusset extending along a lower surface of the inner platform, opposite the root section. An outer platform is coupled to a tip section of the airfoil, with a multi-lobed gusset extending along an upper surface of the inner platform, opposite the tip section.

25 Claims, 4 Drawing Sheets

STRUCTURAL STATOR AIRFOIL

BACKGROUND

This invention relates generally to turbomachinery, and specifically to stator vanes for the compressor, turbine or fan section of a gas turbine engine. In particular, the invention concerns a stator airfoil with structural features.

Gas turbine engines provide reliable, efficient power for a wide range of applications, including aviation and industrial power generation. The turbine engine is built around a power core made up of a compressor, combustor and turbine, arranged in flow series with an upstream inlet and downstream exhaust.

The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Small-scale gas turbines generally utilize a one-spool design, with co-rotating compressor and turbine sections. Larger-scale combustion turbines, jet engines and industrial gas turbines (IGTs) are typically arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, and to generate lift for conversion to rotational energy in the turbine.

Aviation applications include turbojet, turbofan, turboprop and turboshaft configurations. Turbojets are an older design, in which thrust is generated primarily from the exhaust. In turbofan and turboprop engines, the typical configurations for modern fixed-wing aircraft, the low pressure spool is coupled to a propulsion fan or propeller. Turboshaft engines are used on rotary-wing aircraft, including helicopters.

In turbofan engines, the fan rotor typically operates as a first stage compressor, or as the pre-compressor stage for a low-pressure compressor or booster module. This design poses additional structural constraints on the engine, because the fan is coupled to both the core and bypass flowpaths, and the fan duct must be rigidly supported from the power core.

SUMMARY

This invention concerns a stator vane for a gas turbine engine. The vane includes an airfoil section coupled to inner and outer platforms. The airfoil section extends in a chordwise direction from a leading edge to a trailing edge, and in a spanwise direction from a root portion adjacent the inner platform to a tip portion adjacent the outer platform.

The inner platform includes a curvilinear gusset extending opposite the root portion of the airfoil. The outer platform includes a multi-lobed or multi-legged gusset, extending opposite the tip portion of the airfoil.

DETAILED DESCRIPTION

Figure 1:
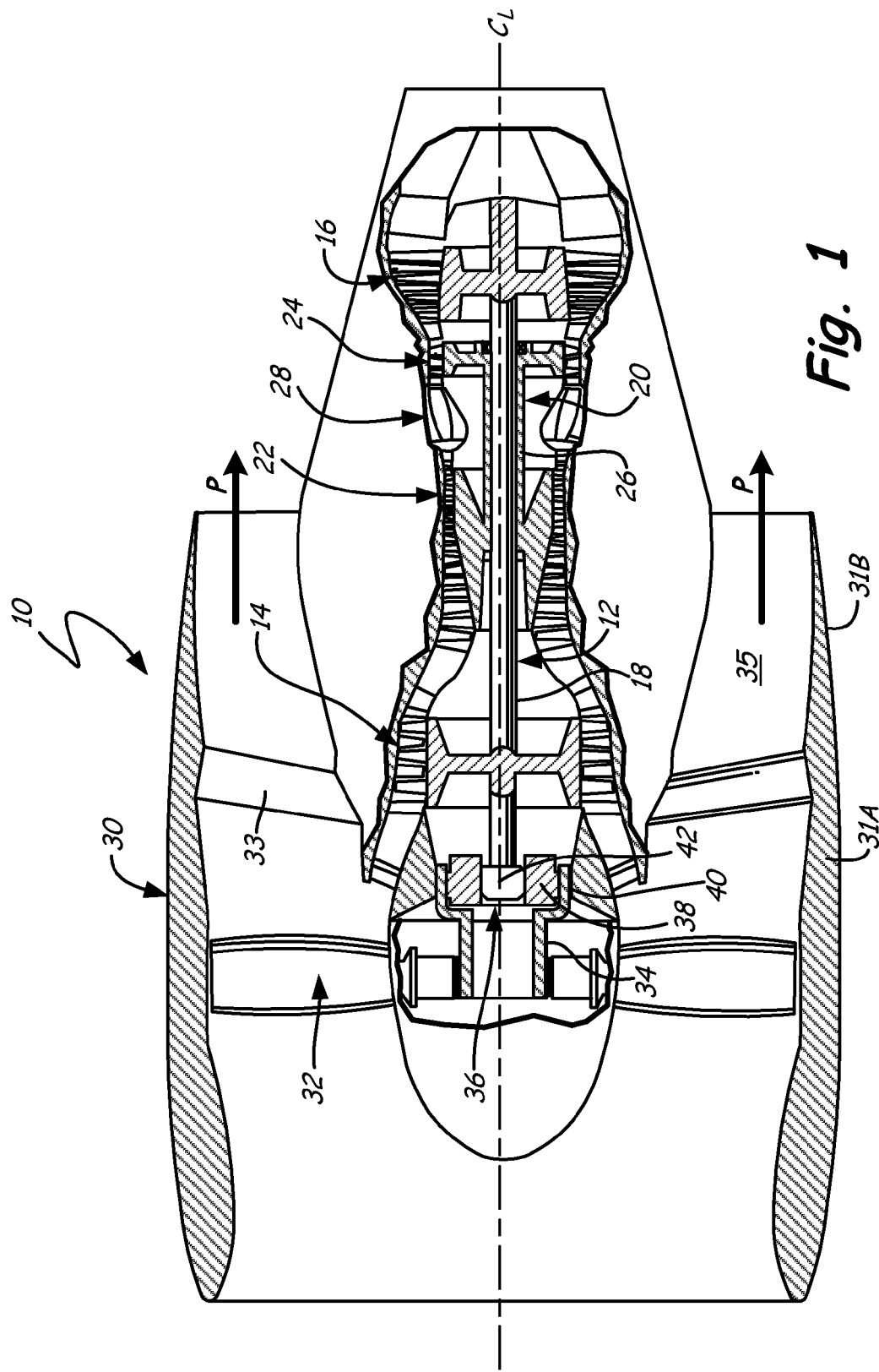
FIG. 1 is a cross-sectional view of a gas turbine engine.

FIG. 1 is a cross-sectional view of gas turbine engine 10, in a two-spool turbofan configuration for use as a propulsion engine. In this particular example, low spool 12 includes low pressure compressor (LPC) 14 and low pressure turbine (LPT) 16, rotationally coupled via low pressure shaft 18. High spool 20 includes high pressure compressor (HPC) 22 and high pressure turbine (HPT) 24, rotationally coupled via high pressure shaft 26. Combustor 28 is arranged in flow series between high pressure compressor 22 and high pressure turbine 24, with low and high spools 12 and 20 coaxially oriented about engine centerline (or turbine axis) $C_L$ of gas turbine engine 10.

Nacelle 30 is coaxially oriented about the forward end of the power core, with fan casing 31A extending from fan stage 32 to fan exhaust duct 31B, downstream of fan exit guide vane (FEGV) 33. Fan shaft 34 is rotationally coupled to fan stage (or fan rotor) 32, generating propulsive flow P through fan duct (or bypass duct) 35. In advanced engine designs, fan drive gear system 36 is used to couple fan shaft 34 to low spool 12, with ring, sun, star and planetary gear mechanisms 38, 40 and 42 to provide independent fan speed control for reduced noise and improved operating efficiency.

As shown in FIG. 1, fan exit guide vanes 33 provide structural support for nacelle 30, fan casing 31A and fan exhaust duct 31B. Fan exit guide vanes 33 also remove swirl from propulsive flow P downstream of fan rotor 32, increasing thrust. This approach eliminates the need for separate aerodynamic struts, reducing engine size and weight for improved performance and efficiency. The configuration of vanes 33 also allows gas turbine engine 10 to be smaller and lighter, reducing fuel use and environmental impact.

At the same time, airfoil loading is high during operation of gas turbine engine 10, imposing substantial structural demands on vanes 33. This issue is addressed via a multi-function part design, as applied to fan exit guide vanes 33 and other circumferentially arranged stator vane assemblies for gas turbine engine 10.

The primary functions of fan exit guide vanes 33 include directing flow in bypass duct 35, and providing mechanical connections to transfer loads between adjacent engine structures. In particular, vanes 33 provide a basic load path for all operating conditions of gas turbine engine 10, including static structural loads, flight-induced loads and vibratory loads on nacelle 30, fan casing 31A and fan exhaust duct 31B, and on the airfoil sections of fan exit guide vanes 33 themselves.

Vanes 33 also provide integrated features that serve multiple functions, including position control for nacelle 30 to maintain clearance between fan casing 31A and fan rotor 32 during flight operations, and thrust reverser support and alignment in the downstream section of fan exhaust duct 31B. Fan exit guide vanes 33 also provide an electrically conducting flow path between nacelle 30 and the power core, and include mounting structures designed for more efficient maintenance of gas turbine engine 10, as described below.

Figure 2:
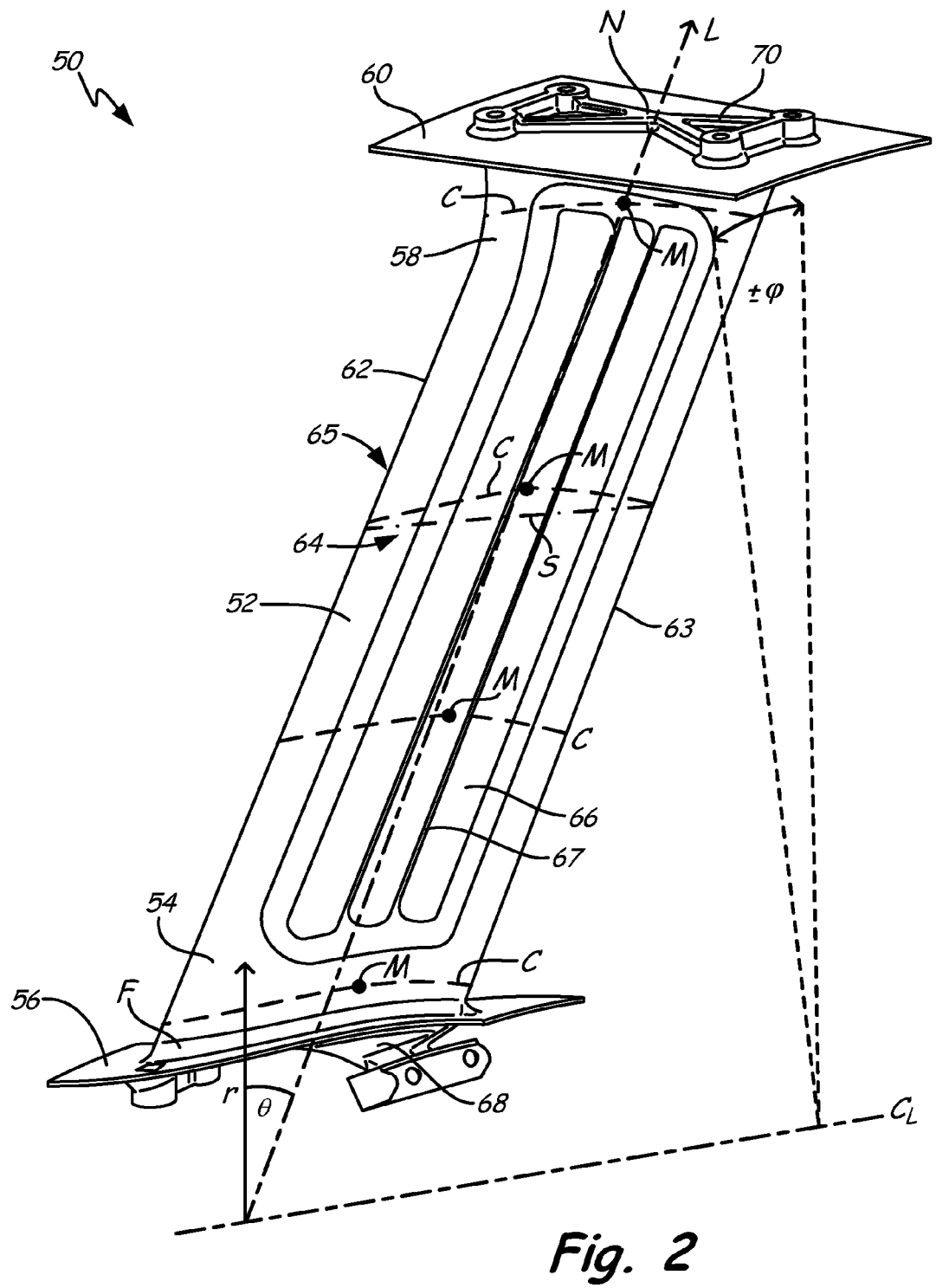
FIG. 2 is a perspective view of a stator vane for the gas turbine engine, showing an airfoil section.

FIG. 2 is perspective view of vane 50 for a gas turbine engine, for example fan exit guide vane 33 for turbofan engine 10 of FIG. 1. Alternatively, vane 50 operates as a stator airfoil for the fan, compressor or turbine section of a different gas turbine engine, in any of the designs and configurations described above.

Vane 50 includes airfoil portion 52 with root section 54 coupled to inner platform 56 at fillet F. Airfoil 52 extends in a spanwise direction from root section 54 to tip section 58, with tip section 58 coupled to outer platform 60.

Inner and outer platforms 56 and 60 are used to mechanically attach or mount vane 50 within an annular flow structure, for example a fan duct, compressor duct, turbine duct or transition duct. When vane 50 is mounted for operation in a gas turbine engine, ID platform 56 is positioned at a radially inner diameter (ID), and attached using bolts or similar devices intended for that purpose. Outer platform 60 is positioned at a radially outer diameter (OD), and attached with additional bolts or mechanical elements.

Alternatively, vane 50 is configured as a shrouded rotor blade, with rotating inner and outer platforms 56 and 60. In these designs, vane 50 is typically referred to as a blade, and airfoil portion 52 is referred to as a blade airfoil. Vane 50 may also be configured as an unshrouded rotor blade or cantilevered stator vane, with root section 54 attached to a rotating or stationary inner or outer platform 56 or 60, and extending to an unshrouded tip section 58. Thus, the terms blade and vane are both be used, depending on whether airfoil section 52 is configured for operation as a stationary (stator vane) element, or a rotating (rotor blade) element.

Longitudinal axis L extends in a substantially radial or spanwise direction along the blade midchord (half of axial chord S), from root section 54 to tip section 58 of airfoil 52. As shown in FIG. 2, longitudinal axis L is canted or swept at angle θ with respect to turbine axis $C_L$, and angled respect to the planes of attachment defined along ID and OD platforms 56 and 60, at the inner and outer limits of longitudinal axis L.

Note that longitudinal axis L may or may not fall along one or more maximum camber points M, as defined for individual camber lines C. Camber lines C give the curvature of airfoil 52, as a function of span along longitudinal axis L. Each camber line C extends in an axial or chordwise sense between leading edge 62 and trailing edge 63, along the mean line of the blade profile, halfway between concave (or pressure) surface 64 and convex (or suction) surface 65, on the front and back sides of airfoil 52, respectively.

The orientation of vane 50 (including cant angle θ) serves at least two functions. First, cant angle θ varies the rotor/stator spacing between the radial extremes of longitudinal axis L; that is, between the upstream rotor stage and root section 54 of vane airfoil 52, at ID platform 56, as compared to tip section 58, at OD platform 60. Second, cant angle θ improves resistance to damage caused by objects ingested or released into the gas flow path, in any form. This includes ingestion of foreign objects at the inlet, leading to foreign object damage or FOD events, and propagation of released objects along the gas flowpath, leading to domestic object damage or DOD events.

Cant angle θ is generally measured as a simple angle from a perpendicular to the engine centerline; that is, in a plane from the radial direction (r) toward turbine axis $C_L$, up to the projection of longitudinal axis L in the radial-axial plane of radius r and turbine axis $C_L$. Alternatively, cant angle θ is measured as a compound angle; that is, from radius r to longitudinal axis L extending out of the radial-axial plane, including exit angle variations ±φ. Typical values for cant angle θ range from 5° to 30°, for example at least 20° to at least 25°, or about 30°. These values of cant angle θ are selected for structural purposes, as described above, and to produce sufficient variation in rotor/stator spacing to attenuate acoustic impulses emitted from the main thrust producing fan or compressor stage, or other upstream compressor or turbine rotor stage.

Cant angle θ also orients the longitudinal flow surfaces formed by ID and OD platforms 56 and 60 at an angle relative to longitudinal axis L of airfoil 52. This directs working fluid flow axially downstream through the propulsion engine, contributing to increased performance and thrust.

To produce vane 50, airfoil portion 52 and platforms 56 and 60 may be machined or manufactured from one or more metal forgings, sheets or stock materials, for example using aluminum or titanium alloy, or a high temperature metal such as a nickel-based or cobalt-based superalloy. Alternatively, vane 50 can be made from a combination of materials, for example metal and graphite-based materials or other composites.

To reduce weight while retaining strength and structural integrity, internal voids or cavities 66 may be formed by machining pressure surface 64 or suction surface 65 of airfoil 52 between ribs 67. Depending on design, cavities 66 may be filled with a lightweight material for improved impact resistance, for example aluminum foam, or left hollow. Alternatively, cavities 66 may be provided with cooling fluid for internal or external cooling, for example in a compressor or turbine section where airfoil section 52 is subject to high temperature flow.

Cavities 66 are then covered with one or more panels on either the front or back of airfoil 52, in order to define aerodynamically smooth pressure and suction surfaces 64 and 65. Alternatively, cavities 66 are formed as an insert, which is bonded between pressure surface 64 and suction surface 65 as a unit.

Internal cavities 66 and ribs 67 are configured to prevent local distortion under severe load and vibratory excitations, while at the same time reducing mass. The configuration of vanes 50 with cant or sweep angle θ also provides additional attachment area for ID and OD platforms 56 and 60, creating inner and outer flow surfaces with aerodynamic integrity. Vanes 50 also reduce the effect of forced vibratory excitations, and contribute to the load carrying capacity of the main engine structure.

Airfoil 52 thus forms a load-carrying aerodynamic structure between pressure surface 64 and suction surface 65, connecting ID platform 56 to OD platform 60 along longitudinal axis L. This allows vane 50 to provide overall structural and vibration stability, while at the same time redirecting flow to improve engine operations, either by tangential action on the fan exhaust to improve thrust output, or by other compressor or turbine flow turning distribution.

To transfer operational and structural loads across the load-bearing structure of airfoil 52, ID and OD platforms 56 and 60 include ID and OD gussets 68 and 70, respectively. In the particular configuration of FIG. 2, for example, ID platform 56 includes curvilinear gusset 68, which follows camber line C as defined along root section 54 of airfoil 52, opposite curvilinear gusset 68 on ID platform 56. OD platform 60 includes multi-lobed or multi-legged OD gusset 70, with nexus N defined on the upper surface of OD platform 60, opposite maximum camber point M as defined for tip section 58 of airfoil 52.

For each camber line C, maximum camber point M is defined by the greatest (perpendicular) distance between camber line C and axial chord S, as shown in FIG. 2, and as known in the art. Individual camber lines C and maximum camber points M vary between root section 54 to tip section 58, reflecting blade twist and the load distribution along the span of airfoil 52, between ID platform 56 and OD platform 60.

The position of maximum camber point M also depends upon variation ±φ in the trailing edge angle of airfoil 52, as measured in a circumferential sense about turbine axis $C_L$, at trailing edge 63 of airfoil 52 in tip section 58. The trailing edge angle varies according to the desired turning provided by vane (or vane class 50), and is not uniform from vane to vane, in order to account for different flow turning distributions about engine axis $C_L$.

In fan exit guide vane applications of vane 50, for example, one class of vane is configured with a uniform exit angle (that is, with variation $\phi=0$), while other classes of vanes are configured with non-uniform exit angles to direct flow around the engine pylon or other mounting structures. In these and other non-uniform turning configurations, different fan, compressor and turbine vane classes may have exit angle variations $\pm\phi$ of at least 5° in magnitude, or at least 10° in magnitude or more, depending on engine design and flow configuration.

Figure 3A:
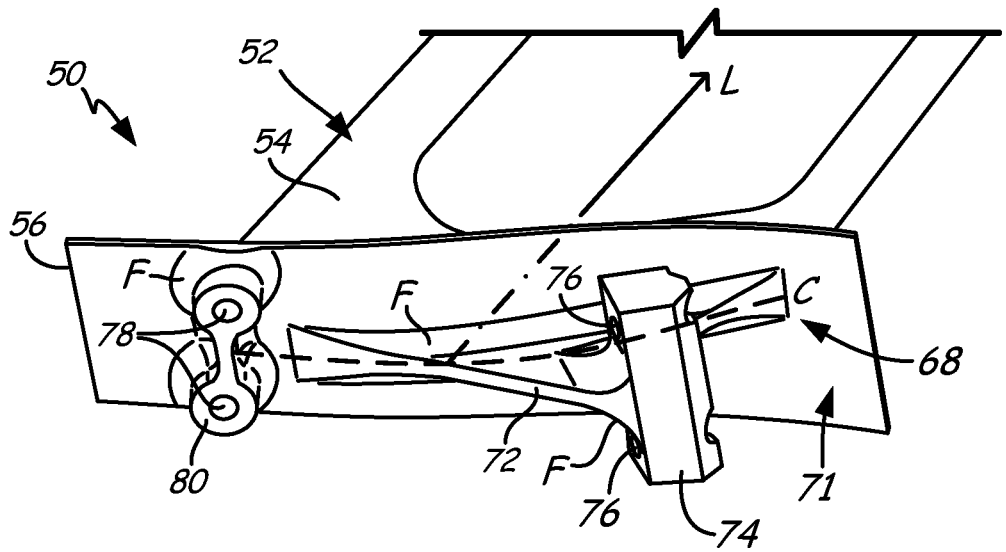
FIG. 3A is a detail showing an inner platform for the vane, with a curvilinear gusset extending opposite the airfoil.

FIG. 3A is a detail showing ID platform 56 of vane 50, with curvilinear gusset 68. Curvilinear gusset 68 follows the shape of camber line C along lower (radially inner, or bottom) surface 71 of ID platform 56, where camber line C is defined for root section 54 of airfoil 52, on the opposite side of gusset 68 with respect to longitudinal axis L.

Curvilinear gusset 68 includes web portion 72 and chevron joint or mount portion 74. The upper (radially outer) part of web 72 is attached to lower surface 71 of ID platform 56, and the lower (radially inner) part of web 72 is attached to chevron joint 74.

Typically, web 72, chevron joint 74 and the other components of curvilinear gusset 68 are attached along structural fillets F, formed either by welding or machining. In some designs, curvilinear gusset 68 and ID platform 56 are integrally formed from a stock, sheet or other workpiece, for example by machining the metal or composite material of vane 50 and airfoil section 52, as described above. Alternatively, one or both of ID platform 56 and ID gusset 68 are formed separately, and attached via welding or other bonding process.

Axial bolt holes 76 are formed by drilling or machining chevron joint 74, at the aft end of ID platform 56 on web 72. Radial bolt holes 78 are formed by drilling or machining forward ID mount 80, at the forward end of ID platform 56 on lower surface 71.

As shown in FIG. 3A, web portion 72 of curvilinear ID gusset 68 follows camber line C of airfoil 52, as defined along root section 54, opposite bottom surface 71 of ID platform 56. In some designs, web 72 extends along the aft portion of camber line C, as shown in FIG. 3A, and forward ID mount 80 is axially spaced from the forward end of ID gusset 68. Alternatively, web 72 extends along substantially the full length of camber line C, and forward ID mount 80 forms the axially forward portion of ID gusset 68.

The curved camber line configuration of ID gusset 68 more efficiently transfers structural, vibratory and flow-induced loads between airfoil 52 and ID platform 56, with better resistance to stress, strain and fatigue. In particular, ID gusset 68 provides a primary interfacing structural joint in the aft region of ID platform 56, in a curvilinear design configured for self-correction of varying load path vectors.

The curvature of ID gusset 68 along camber line C also reduces mechanical contacting stress, relative to previous (e.g., linear) designs, and multiplies the effective surface area for load transfer in a similar space envelope. In addition, curvilinear ID gusset 68 reduces mechanical stress (or distress) at the fixity point, defined here at the radially inner extreme of longitudinal axis L.

Figure 3B:
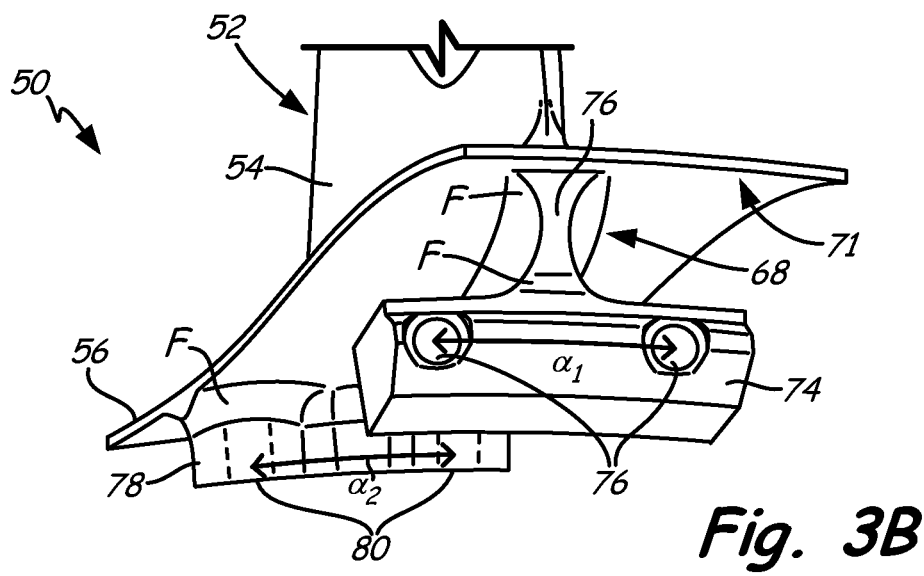
FIG. 3B is a detail showing a bolt hole configuration for the inner platform.

FIG. 3B is a detail showing a bolt hole configuration for ID platform 56 of vane 50. Operational loads are transferred to and from airfoil 52 by mounting vane 50 to an engine case or other structure, using axial bolt holes 76 in chevron joint 74, at the axially aft end of ID platform 56, and radial bolt holes 78 in forward ID mount 80, at the axially forward end of ID platform 56.

The curvilinear geometry of ID gusset 68 allows ID platform 56 and the attached structures of vane 50 to be rotated out of position for access. Combined with the axial/radial bolting configuration of ID platform 56, this allows vanes 50 to be attached at either end for assembly and disassembly, including removal of the fan casing with vanes 50 remaining attached to the engine core, or removal of the engine core with vanes 50 remaining attached to the fan casing. The configuration of vane 50 thus reduces maintenance costs, by not requiring removal of unnecessary engine parts during routine servicing, or during engine disassembly and transport.

As shown in FIG. 3B, axial bolt holes 76 are uniformly positioned in a circumferential direction along adjacent ID platform 56, with uniform angular spacing $\alpha_1$ between adjacent centers, as shown in FIG. 3B. Similarly, radial bolt holes 78 are uniformly positioned in the circumferential direction, with uniform on-center angular spacing $\alpha_2$. Thus, each ID platform 56 is mounted with the same bolt configuration, regardless of vane class or variations in camber C. This contrast with the OD platform mounting scheme, as described below.

Figure 4:
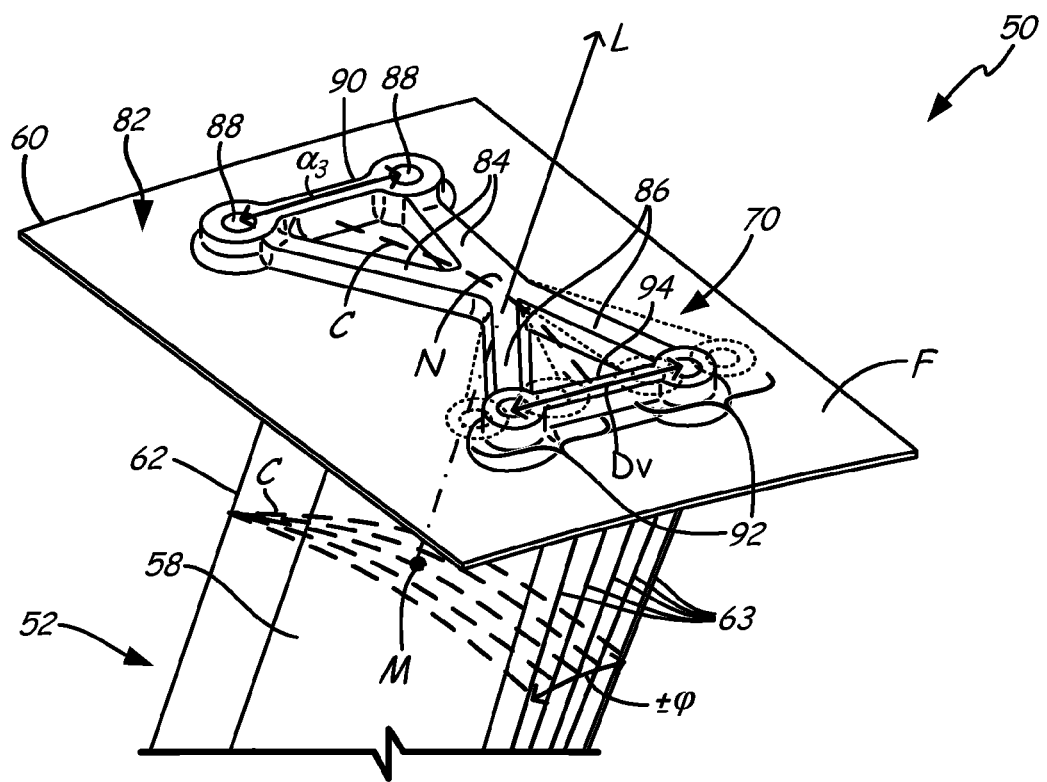
FIG. 4 is a detail showing an outer platform for the vane, with a multi-lobed gusset extending opposite the airfoil.

FIG. 4 is a detail showing OD platform 60 for vane 50, with multi-lobed OD gusset 70. Multi-lobed gusset 70 is formed on formed on upper (radially outer, or top) surface 82 of OD platform 60, for example in a K-shaped or X-shaped configuration with at least four lobes or legs 84 and 86 extending forward and aft from nexus N, as shown in FIG. 4.

Forward lobes (or legs) 84 of OD gusset 70 meet aft lobes (or legs) 86 at nexus N, opposite maximum camber point M of airfoil 52. Maximum camber point M is defined along camber line C of airfoil tip section 58, opposite top surface 82 of OD platform 60 along longitudinal axis L.

Forward legs 84 of OD gusset 70 extend axially forward from nexus N to forward bolt holes 88, with uniform circumferential spacing $\alpha_3$ along forward cross-member 90. Aft legs 86 extend axially rearward from nexus N to aft bolt holes 92, with variable spacing $D_V$ along aft cross-member 94.

In contrast to uniform spacing $\alpha_3$ for forward bolt holes 88, variable spacing $D_V$ for aft bolt holes 92 is defined by angular variation $\pm\phi$ in the trailing edge angle of airfoil 52. Thus FIG. 4 illustrates a plurality of vanes 50, each selected from a different vane classes with a different trailing edge angle distribution, such that the trailing edge angles differ by $\pm\phi$ to provide a non-axially symmetric flow turning pattern to accommodate a downstream strut, fairing or pylon, as described above.

Angular variation $\pm\phi$ is defined in a circumferential sense about the turbine axis, as shown in FIG. 2, above, and is the substantially the same at trailing edge 63 of airfoil 52 in tip section 58, and at aft bolt holes 92 on multi-lobed gusset 70. In vane classes where trailing edge 63 is shifted by angle $+\phi$ in the circumferential direction, for example, as compared to a uniform circumferential spacing arrangement, aft bolt holes 92 are shifted by the same angle $+\phi$, for example 0 to $+5°$ or more, or up to $+10°$ or more.

In vane classes where trailing edge 63 is shifted by angle $-\phi$, aft bolt holes are shifted in the other direction, where the shift has the same typical magnitudes. Thus the relative position of aft bolt holes 92 with respect to forward bolt holes 88 is defined by the trailing edge angle of airfoil 52, as defined along trailing edge 63 of airfoil tip section 58.

This arrangement keeps aft bolt holes 92 circumferentially spaced on either side of camber line C for each vane class, but shifted in a circumferential sense with respect to adjacent vanes 50 in a different class. In addition to structural load-bearing and load transfer benefits, shifting the relative positions of aft bolt holes 92 thus provides an installation check or foolproof as well, because vanes of one class will not mount with the same aft bolt hole configuration as vanes in another class.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. An airfoil comprising:
a leading edge, a trailing edge, and pressure and suction surfaces defined therebetween;
an inner platform coupled to a root section of the airfoil, the inner platform comprising a curvilinear gusset extending along a lower surface of the inner platform, opposite the root section, wherein the curvilinear gusset extends along a camber line of the airfoil defined in the root section of the airfoil opposite the curvilinear gusset;
an outer platform coupled to a tip section of the airfoil, the outer platform comprising a multi-lobed gusset extending along an upper surface of the outer platform, opposite the tip section;
wherein the multi-lobed gusset comprises four legs meeting at a nexus, wherein two of the four legs extend axially forward from the nexus and two of the four legs extend axially aft from the nexus.

2. The airfoil of claim 1, wherein the curvilinear gusset comprises a web attached to the lower surface of the inner platform and a mounting element attached to the web, and further comprising an axially oriented bolt hole in the mounting element.

3. The airfoil of claim 2, wherein the inner platform comprises a radially oriented bolt hole.

4. The airfoil of claim 1, wherein the nexus is positioned opposite a maximum camber point on a camber line defined in the tip section of the airfoil, opposite the multi-lobed gusset.

5. The airfoil of claim 1, wherein the four legs extend from the nexus to axially forward and axially aft bolt holes on the upper surface of the outer platform.

6. The airfoil of claim 5, wherein a relative position of the axially aft bolt holes with respect to the axially forward bolt holes is defined based on a trailing edge angle of the tip section of the airfoil.

7. A fan duct comprising a plurality of circumferential arranged airfoils, wherein each of the plurality of airfoils is configured as the airfoil defined in claim 1.

8. A turbofan engine comprising the fan duct of claim 7.

9. The airfoil of claim 1, wherein the airfoil is mounted in a gas turbine engine with a cant angle between 5° and 30°, as measured from a radial direction perpendicular to an axial centerline of the gas turbine engine.

10. A vane comprising:
an airfoil defined between pressure and suction surfaces, the pressure and suction surfaces extending from a leading edge of the airfoil to a trailing edge of the airfoil, the leading and trailing edges extending from a root section of the airfoil to a tip section of the airfoil;
an inner platform attached to the root section, the inner platform comprising a curvilinear gusset on a lower surface of the inner platform opposite the airfoil, the curvilinear gusset extending along a camber line of the airfoil defined in the root section of the airfoil, opposite the curvilinear gusset, wherein the curvilinear gusset comprises a joint disposed proximate an aft portion of the inner platform, and wherein the joint extends in the circumferential direction and includes an axially oriented bolt hole; and
an outer platform attached to the tip section of the airfoil.

11. The vane of claim 10, wherein the curvilinear gusset comprises a radially oriented bolt hole on an axially forward portion of the inner platform.

12. The vane of claim 10, wherein the outer platform comprises a multi-lobed gusset extending along an upper surface of the outer platform, opposite the tip section of the airfoil, wherein the multi-lobed gusset comprises four legs meeting at a nexus, wherein two of the four legs extend axially forward from the nexus and two of the four legs extend axially aft from the nexus.

13. The vane of claim 12, wherein the nexus of the multi-lobed gusset is positioned opposite a maximum camber point of the airfoil, the maximum camber point defined along a camber line in the tip section of the airfoil, opposite the multi-lobed gusset.

14. The vane of claim 12, wherein the legs of the multi-lobed gusset extend between axially forward and axially aft bolt holes on the upper surface of the outer platform, and wherein a relative position of the axially forward and axially aft bolt holes is defined by a trailing edge angle of the airfoil in the tip section.

15. A plurality of vanes, wherein each of the plurality of vanes is configured as the vane defined in claim 14, and wherein the plurality of vanes define two airfoil classes having different trailing edge angles at the tip sections of the airfoils.

16. The plurality of vanes as defined in claim 15, wherein the trailing edge angles of the two airfoil classes differ by at least 5° with respect to an axial direction.

17. The plurality of vanes as defined in claim 15, wherein the trailing edge angles of the two airfoil classes differ by at least 10° with respect to an axial direction.

18. A propulsion engine comprising a plurality of vanes, wherein each of the plurality of vanes is configured as the vane defined in claim 14, and wherein the plurality of vanes are circumferentially arranged about a fan duct.

19. A guide vane comprising:
an airfoil extending from a leading edge to a trailing edge, the leading and trailing edges extending from a root section of the airfoil to a tip section of the airfoil;
an inner platform attached to the root section of the airfoil, the inner platform comprising a curvilinear gusset extending opposite the airfoil along a camber line defined in the root section; and
an outer platform attached to the tip section of the airfoil, the outer platform comprising a multi-lobed gusset having a nexus positioned opposite a maximum camber point defined in the tip section of the airfoil, wherein the multi-lobed gusset comprises two legs extending axially forward from the nexus on the outer platform and two legs extending axially aft from the nexus on the outer platform.

20. The guide vane of claim 19, wherein the inner platform comprises a radial bolt hole and the curvilinear gusset comprises a mount portion with an axial bolt hole.

21. The guide vane of claim 19, wherein the two legs extending axially forward from the nexus extend to axially forward bolt holes on an upper surface of the outer platform, and the two legs extending axially aft from the nexus extend to axially aft bolt holes on the upper surface of the outer platform, opposite the tip section of the airfoil.

22. The guide vane of claim 21, wherein a relative position of the axially aft bolt holes with respect to the axially forward bolt holes is defined by a trailing edge angle of the airfoil in the tip section.

23. A plurality of guide vanes as defined by the vane in claim 19, wherein the plurality of guide vanes define vane classes with trailing edge angles that differ by at least 5°.

24. A turbofan engine comprising a plurality of guide vanes as defined by the vane in claim 19, wherein the plurality of guide vanes are coaxially arranged about a power core comprising a compressor, a combustor and a turbine in flow series.

25. The turbofan engine of claim 24, wherein the guide vanes have a cant angle between 5° and 30° as measured from a radial direction perpendicular to a centerline of the turbofan engine.

* * * * *